US012723424B1

(12) United States Patent
Wan et al.

(10) Patent No.: US 12,723,424 B1
(45) Date of Patent: Sep. 1, 2026

(54) SOLAR-POWERED INFLATABLE SWIMMING POOL WITH LIGHTS

(71) Applicant: SHENZHEN COOTWAY TECHNOLOGY CO., LTD., Shenzhen (CN)

(72) Inventors: Gangbin Wan, Sichuan Province (CN); Chunhai Zhao, Deyang (CN); Daiquan Li, Deyang (CN)

(73) Assignee: SHENZHEN COOTWAY TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 19/391,112

(22) Filed: Nov. 17, 2025

(30) Foreign Application Priority Data

Oct. 24, 2025 (CN) ........................ 202522254806.X

(51) Int. Cl.

| | |
|---|---|
| ***E04H 4/14*** | (2006.01) |
| ***E04H 4/00*** | (2006.01) |
| ***F21S 8/00*** | (2006.01) |
| ***F21S 9/03*** | (2006.01) |
| ***F21W 131/401*** | (2006.01) |
| ***F21Y 103/20*** | (2016.01) |
| ***F21Y 103/30*** | (2016.01) |
| ***F21Y 115/10*** | (2016.01) |

(52) U.S. Cl.
CPC ........... *E04H 4/148* (2013.01); *E04H 4/0025* (2013.01); *F21S 8/03* (2013.01); *F21S 9/035* (2013.01); *F21W 2131/401* (2013.01); *F21Y 2103/20* (2016.08); *F21Y 2103/30* (2016.08); *F21Y 2115/10* (2016.08)

(58) Field of Classification Search
CPC .............................. E04H 4/148; E04H 4/0025
See application file for complete search history.

(56) References Cited

U.S. PATENT DOCUMENTS 9,901,836 B1 * 2/2018 Moreland ............... B05B 15/62
2006/0291217 A1 * 12/2006 Vanderschuit ......... A63H 33/22 362/363
2019/0269246 A1 * 9/2019 Youngblood ............. E04H 4/00

OTHER PUBLICATIONS

April M Jul. 2, 2024 https://www.amazon.com/product-review/BOCTF1L5VC/ref=cm_cr_arp_d_paging_btm_next_2?ie=UTF8&reviewerType=all_review&mediaType=media_reviews_only&pageNumber=2 (Year: 2024) (Year: 2024).*
Rachell Apr. 14, 2024 https://www.amazon.com/product-reviews/B0CQ56QBQR/ref=cm_cr_getr_d_paging_btm_prev_4?ie=UTF8&reviewerType=all_reviews&pageNumber=4&mediaType=media_reviews_only (Year: 2024) (Year: 2024) (Year: 2024).*

(Continued)

*Primary Examiner* — Eric T Eide

(57) ABSTRACT

A solar-powered inflatable swimming pool with lights includes a main body, a light-emitting module, and a solar module. The main body is provided with a plurality of inflatable components. The light-emitting module is arranged in the main body. The light-emitting module is configured for emitting light and illuminating a swimming pool and a periphery of the swimming pool. The solar module is arranged on the main body. The solar module is configured for receiving solar energy and converting the solar energy into electrical energy for storage via a control board. The control board is configured for transmitting the electrical energy to the light-emitting module and supplying power to the light-emitting module.

20 Claims, 9 Drawing Sheets

(56) References Cited

OTHER PUBLICATIONS

Sargents Jul. 20, 2020 amazon.com https://www.amazon.com/product-reviews/B07VNK5NT2/ref=cm_cr_getr_d_paging_btm_prev_1?ie=UTF8&reviewerType=all_reviews&mediaType=media_reviews_only&pageNumber=1 (Year: 2020) (Year: 2020).*

Supergamer Jul. 6, 2024 https://www.amazon.com/product-reviews/BOD28FPYPQ/ref=cm_cr_arp_d_viewopt_mdrvw?ie=UTF8&reviewerType=all_reviews&mediaType=media_reviews_only&pageNumber=1 (Year: 2024) (Year: 2024).*

Brian lubecki amazon.com Mar. 25, 2024 https://www.amazon.com/product-reviews/BOCQ56QBQR/ref=cm_cr_getr_d_paging_btm_next_4?ie=UTF8&reviewerType=all_reviews&pageNumber=4&mediaType=media_reviews_only (Year: 2024).*

* cited by examiner

SOLAR-POWERED INFLATABLE SWIMMING POOL WITH LIGHTS

CROSS-REFERENCE TO RELATED APPLICATIONS

The application claims priority of Chinese patent application CN202522254806X, filed on Oct. 24, 2025, disclosure of which is incorporated herein by reference in its entirety.

TECHNICAL FIELD

The present disclosure relates to the technical field of inflatable swimming pool, in particular to a solar-powered inflatable swimming pool with lights.

BACKGROUND

Swimming is recognized as one of the physical activities beneficial to human health. During swimming, people typically utilize the buoyancy of water to assume a prone or supine position in the water. This allows the entire body to be relaxed and extended, so as to promote comprehensive, balanced, and coordinated physical development, and contribute to streamlined muscle definition.

Compared to traditional fixed swimming pools, inflatable swimming pools feature the advantages of convenient arrangement and flexible mobility, making them widely popular. However, most existing inflatable swimming pools generally lack an integrated lighting system. This results in low visibility during nighttime, which can easily lead to accidents and make these existing pools difficult to use after dark. To address such problem, some inflatable swimming pools now are equipped with light strips attached to the outer peripheral wall of the pool body to provide illumination. Nevertheless, in such design, the light strips are exposed, which compromises the structural integrity and aesthetic coherence of the pool during use. Furthermore, the exposed light strips are prone to being snagged during use, thereby presenting a safety hazard.

SUMMARY

In order to overcome shortcomings of the existing technology, the present disclosure provides a solar-powered inflatable swimming pool with lights.

The solar-powered inflatable swimming pool with lights includes a main body. The main body is provided with a plurality of inflatable components.

The solar-powered inflatable swimming pool with lights further includes a light-emitting module. The light-emitting module is arranged in the main body. The light-emitting module is configured for emitting light and illuminating the swimming pool and a periphery of the swimming pool.

The solar-powered inflatable swimming pool with lights further includes a solar module. The solar module is arranged on the main body. The solar module is configured for receiving solar energy and converting the solar energy into electrical energy for storage via a control board. The control board is configured for transmitting the electrical energy to the light-emitting module and supplying power to the light-emitting module.

As an improvement of the present disclosure, the plurality of inflatable components include a first inflatable component and a second inflatable component. The first inflatable component is arranged on an upper portion of the second inflatable component. The first inflatable component is in communication with the second inflatable component. A first folding portion is formed at a junction between the first inflatable component and the second inflatable component.

As an improvement of the present disclosure, the first inflatable component includes a first component part, a second component part, and a third component part. A first end of the first component part is connected to the second component part, and a second end of the first component part is connected to the third component part. A first bending portion is formed at a junction between the first component part and the second component part, and a second bending portion is formed at a junction between the first component part and the third component part.

As an improvement of the present disclosure, the first inflatable component further includes a fourth component part. A first end of the fourth component part is connected to the second component part, and a second end of the fourth component part is connected to the third component part. A third bending portion is formed at a junction between the fourth component part and the second component part, and a fourth bending portion is formed at a junction between the fourth component part and the third component part.

As an improvement of the present disclosure, the first component part, the second component part, the third component part, and the fourth component part are connected to form a first cavity.

As an improvement of the present disclosure, the second inflatable component includes a fifth component part, a sixth component part, and a seventh component part. A first end of the fifth component part is connected to the sixth component part, and a second end of the fifth component part is connected to the seventh component part. A fifth bending portion is formed at a junction between the fifth component part and the sixth component part, and a sixth bending portion is formed at a junction between the fifth component part and the seventh component part.

As an improvement of the present disclosure, the second inflatable component further includes an eighth component part. A first end of the eighth component part is connected to the sixth component part, and a second end of the eighth component part is connected to the seventh component part. A seventh bending portion is formed at a junction between the eighth component part and the sixth component part, and an eighth bending portion is formed at a junction between the eighth component part and the seventh component part.

As an improvement of the present disclosure, the fifth component part, the sixth component part, the seventh component part, and the eighth component part are connected to form a second cavity. The second cavity is in communication with the first cavity.

As an improvement of the present disclosure, the plurality of inflatable components further include a third inflatable component. The third inflatable component is arranged at a bottom portion of the second inflatable component. The third inflatable component is in communication with the second inflatable component. A second folding portion is formed at a junction between the third inflatable component and the second inflatable component.

As an improvement of the present disclosure, the third inflatable component includes a ninth component part, a tenth component part, and an eleventh component part. A first end of the ninth component part is connected to the tenth component part, and a second end of the ninth component part is connected to the eleventh component part. A ninth bending portion is formed at a junction between the ninth component part and the tenth component part, and a tenth bending portion is formed at a junction between the ninth component part and the eleventh component part.

As an improvement of the present disclosure, the third inflatable component further includes a twelfth component part. A first end of the twelfth component part is connected to the tenth component part, and a second end of the twelfth component part is connected to the eleventh component part. An eleventh bending portion is formed at a junction between the twelfth component part and the tenth component part, and a twelfth bending portion is formed at a junction between the twelfth component part and the eleventh component part.

As an improvement of the present disclosure, the ninth component part, the tenth component part, the eleventh component part, and the twelfth component part are connected to form a third cavity. The third cavity is in communication with the second cavity.

As an improvement of the present disclosure, the inflatable component further includes a fourth inflatable component. The fourth inflatable component is arranged in the third inflatable component. The fourth inflatable component is connected to the third inflatable component.

As an improvement of the present disclosure, a first through hole is defined in the first inflatable component, and the solar module is arranged in the first through hole. The solar module includes a solar panel and a fixing bracket, and the solar panel is arranged on the fixing bracket. The first inflatable component is further provided with a cover plate. The cover plate is configured for covering on the first through hole, and the cover plate is positioned at one side of the solar panel. The cover plate is made of transparent material.

As an improvement of the present disclosure, a control board is arranged in the first cavity, and the control board is arranged on the fixing bracket. The solar panel is electrically connected to the control board.

As an improvement of the present disclosure, the light-emitting module is arranged in the first cavity. The light-emitting module includes a plurality of LED lamps and a plurality of fixing members. The plurality of fixing members are distributed and fixed on an inner wall of the first cavity. Each LED lamp is arranged on each fixing member. The plurality of LED lamps are electrically connected to the control board.

As an improvement of the present disclosure, a battery is arranged in the first cavity, and the battery is electrically connected to the control board.

As an improvement of the present disclosure, a button is arranged on the first inflatable component, and the button is electrically connected to the control board.

Beneficial effects of the present disclosure are as follows. The present disclosure provides a solar-powered inflatable swimming pool with lights. The solar-powered inflatable swimming pool with lights includes the main body, the light-emitting module, and the solar module. The main body is provided with the plurality of inflatable components. The light-emitting module is arranged in the main body. The solar module is arranged on the main body. The solar module is configured for receiving solar energy during daytime and storing the solar energy via the control board. Further, the solar module is configured for supplying power to the light-emitting module. Through the above structure, the solar module is configured for receiving solar energy during daytime. The control board is configured for converting the solar energy into electrical energy and transmitting the electrical energy to the battery for storage. Therefore, during night-time, the control board is configured for supplying power to the light-emitting module via the energy storage battery. In addition, the LED lamps are driven to illuminate. A swimming pool is surrounded and formed by the plurality of inflatable components. The light from the LED lamps illuminates an interior of the main body and transmits to an exterior of the main body, so as to illuminate the pool. Moreover, the LED lamps are capable of emitting colorful light, thereby providing a wonderful experience for users.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Figure 1:
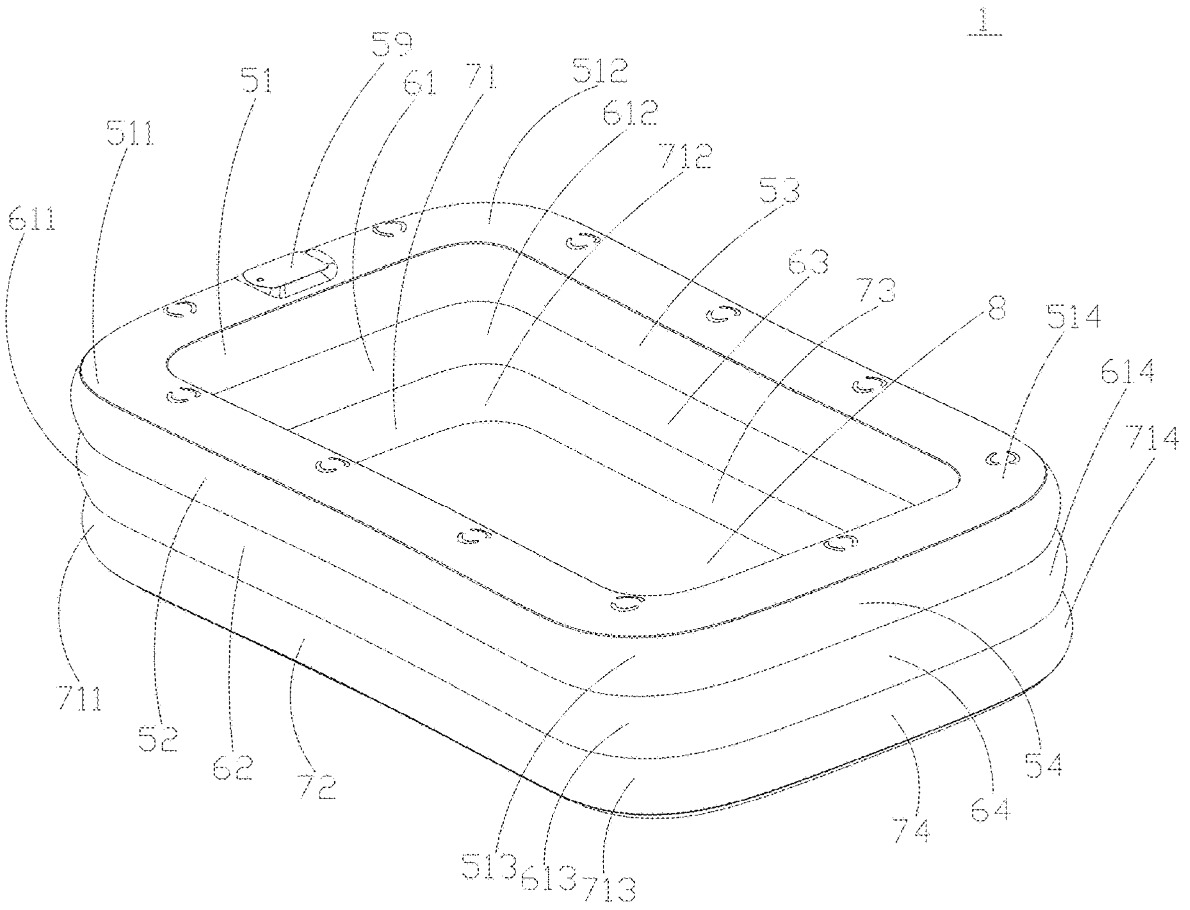
FIG. 1 is a structural diagram of the present disclosure.
Figure 2:
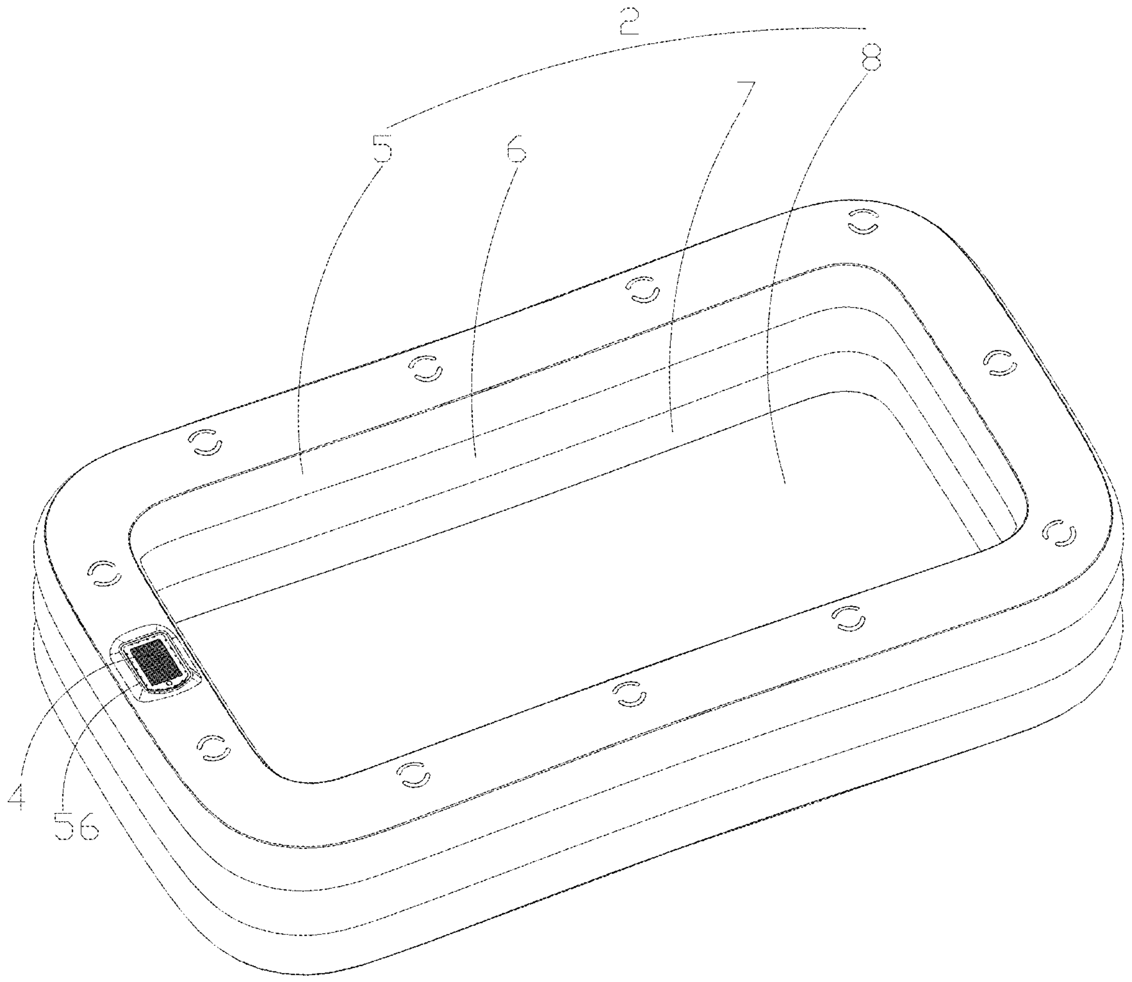
FIG. 2 is a structural diagram showing that a cover plate is removed from the present disclosure.
Figure 3:
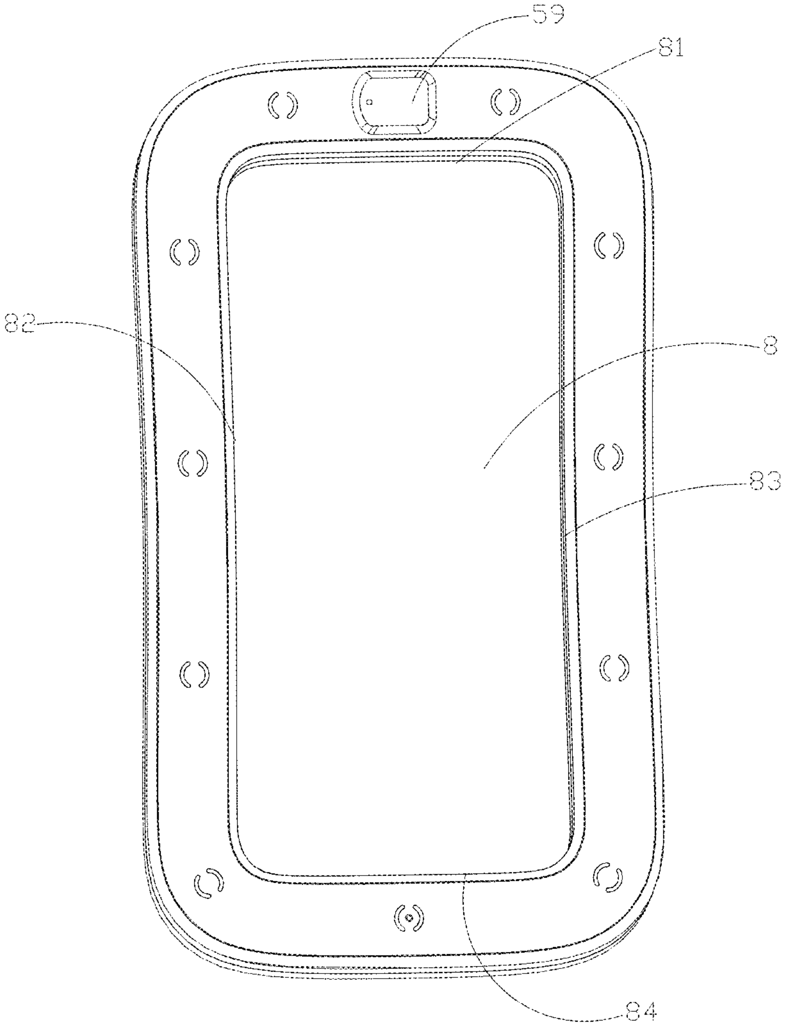
FIG. 3 is a structural diagram of another perspective of the present disclosure.
Figure 4:
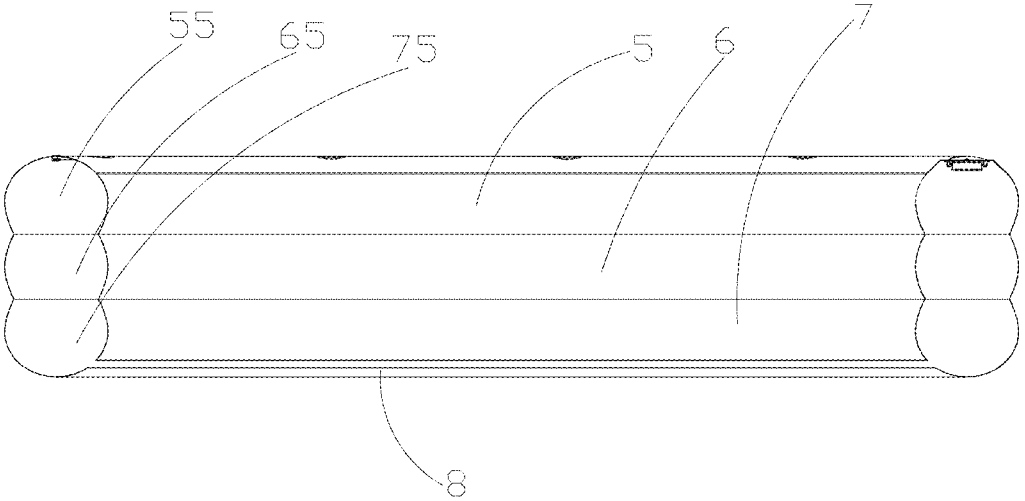
FIG. 4 is a sectional view taken along Y-axis of the present disclosure.
Figure 5:
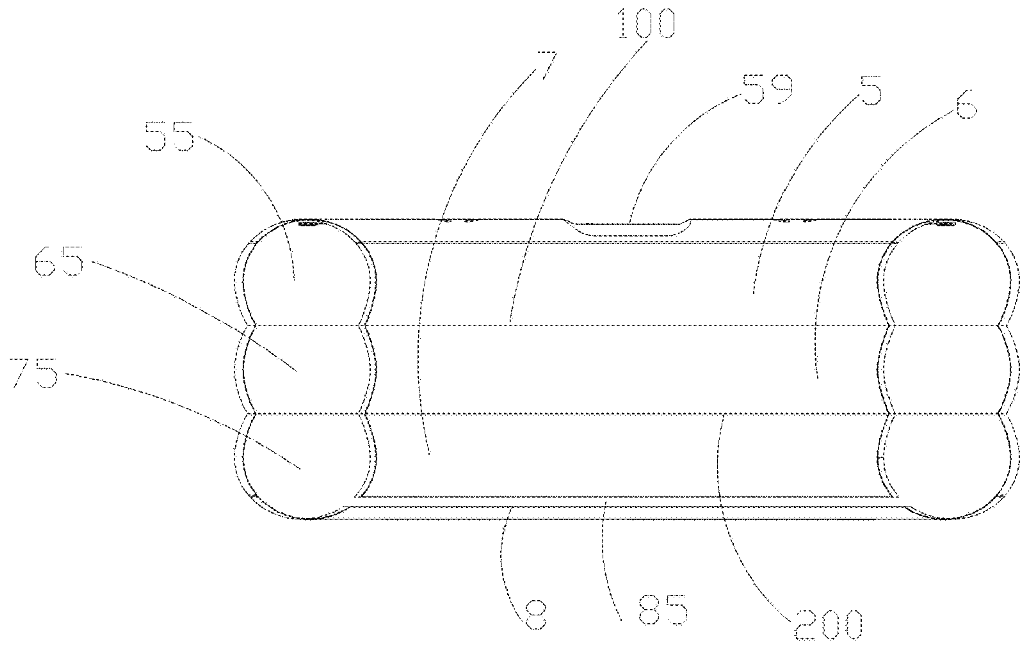
FIG. 5 is a sectional view taken along X-axis of the present disclosure.
Figure 6:
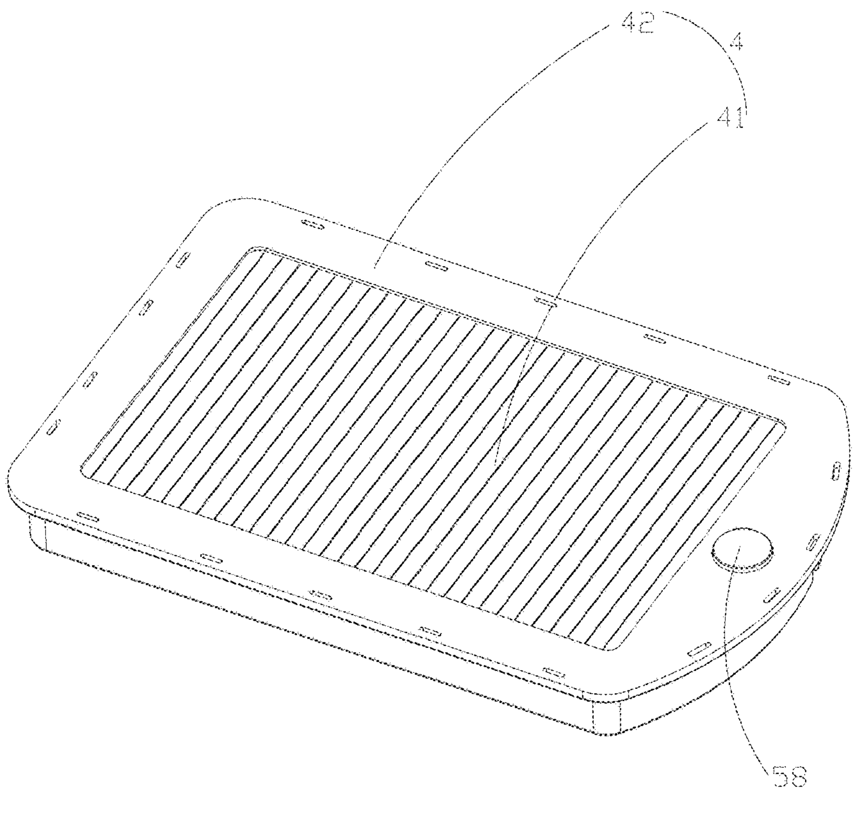
FIG. 6 is a structural diagram of a solar module of the present disclosure.
Figure 7:
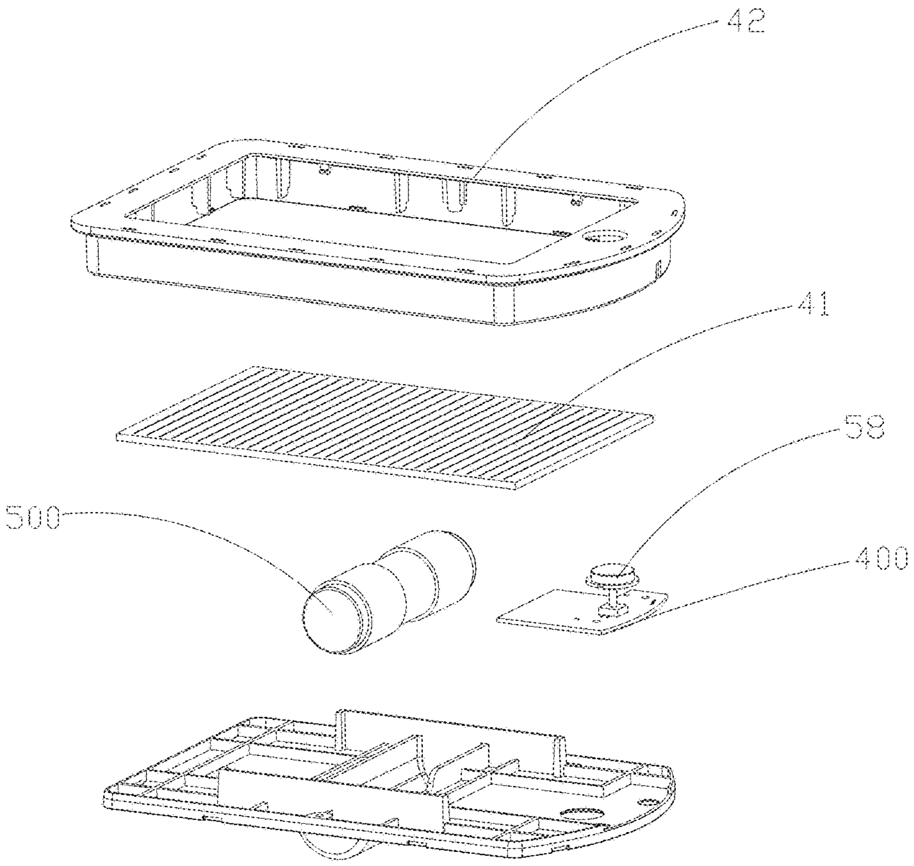
FIG. 7 is an exploded view of the solar module of the present disclosure.
Figure 8:
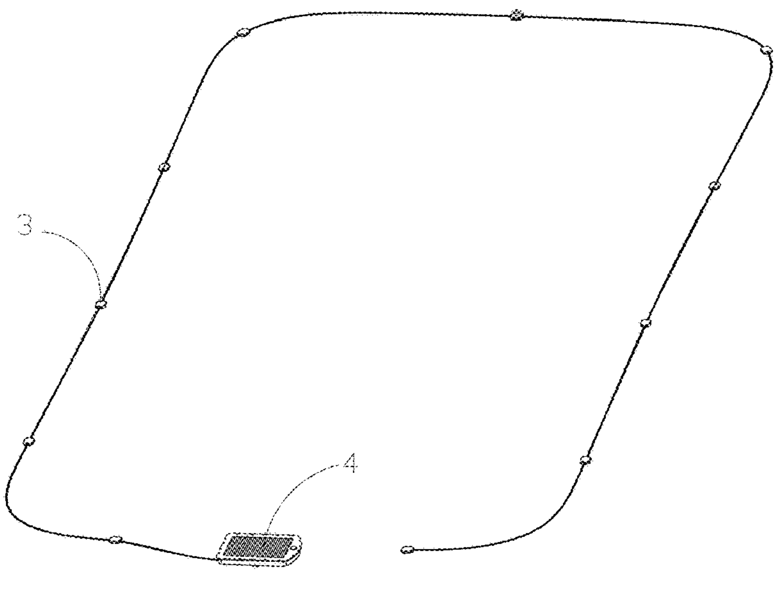
FIG. 8 is a structural diagram of a light-emitting module and the solar module of the present disclosure.
Figure 9:
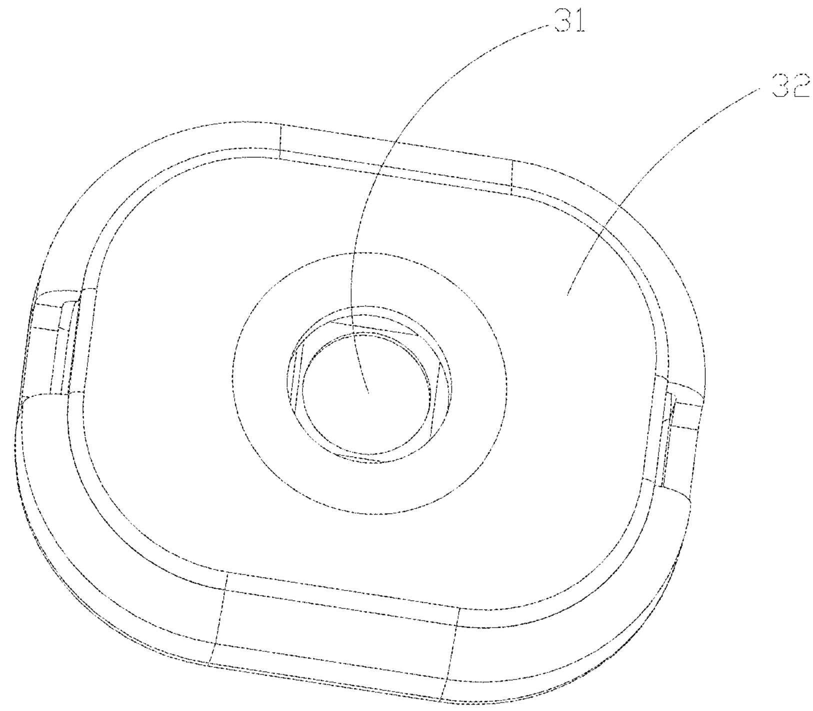
FIG. 9 is a structural diagram of the light-emitting module of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the features. In the description of embodiments of the application, "a plurality of" means two or more, unless otherwise specifically defined.

Referring to FIG. 1-FIG. 9, a solar-powered inflatable swimming pool with lights includes a main body 1, a light-emitting module 3, and a solar module 4. The main body 1 is provided with a plurality of inflatable components 2. The light-emitting module 3 is arranged in the main body 1. The light-emitting module 3 is configured for emitting light to illuminate the swimming pool and a periphery of the swimming pool. The solar module 4 is arranged on the main body 1. The solar module 4 is configured for receiving solar energy and converting the solar energy into electrical energy for storage via a control board 400. The control board 400 is configured for transmitting the electrical energy to the light-emitting module 3 and supplying power to the light-emitting module 3.

Through the above structure, the solar module 4 is configured for receiving solar energy during daytime. The control board 400 is configured for converting the solar energy into electrical energy and transmitting the electrical energy to the battery 500 for storage. Therefore, the control board 400 is configured for supplying power to the light-emitting module 3 via the energy storage battery 500 during night-time. In addition, the LED lamps 31 are driven to illuminate. A swimming pool is surrounded and formed by the plurality of inflatable components 2. The light from the LED lamps 31 illuminates an interior of the main body 1 and transmits to an exterior of the main body 1, so as to illuminate the pool. Moreover, the LED lamps 31 are capable of emitting colorful light, thereby providing wonderful experience for users. The light-emitting module 3 may include a single module or a plurality of modules connected in series. The LED lamps 31 are capable of emitting monochromatic or multi-colored dazzling light. During daytime, the battery 500 is charged and can store energy via the solar module 4. At night, the battery 500 is configured for supplying power to the control board 400 and the light-emitting module 3.

In this embodiment, the plurality of inflatable components 2 include a first inflatable component 5 and a second inflatable component 6. The first inflatable component 5 is arranged on an upper portion of the second inflatable component 6. The first inflatable component 5 is in communication with the second inflatable component 6. A first folding portion 100 is formed at a junction between the first inflatable component 5 and the second inflatable component 6. Through the above structure, the first inflatable component 5 is in communication with the second inflatable component 6. When gas enters the first inflatable component 5, the second inflatable component 6 is filled firstly and then the first inflatable component 5 is filled. When all the gas in the first inflatable component 5 and the second inflatable component 6 is discharged, the first inflatable component 5 and the second inflatable component 6 can be folded together through the first folding portion 100, which facilitates convenient storage and carrying.

In this embodiment, the first inflatable component 5 includes a first component part 51, a second component part 52, and a third component part 53. A first end of the first component part 51 is connected to the second component part 52, and a second end of the first component part 51 is connected to the third component part 53. A first bending portion 511 is formed at a junction between the first component part 51 and the second component part 52. A second bending portion 512 is formed at a junction between the first component part 51 and the third component part 53. The first inflatable component 5 further includes a fourth component part 54. A first end of the fourth component part 54 is connected to the second component part 52, and a second end of the fourth component part 54 is connected to the third component part 53. A third bending portion 513 is formed at a junction between the fourth component part 54 and the second component part 52. A fourth bending portion 514 is formed at a junction between the fourth component part 54 and the third component part 53. The first component part 51, the second component part 52, the third component part 53, and the fourth component part 54 are connected to form a first cavity 55. Through the above structure, the first component part 51, the second component part 52, the third component part 53, and the fourth component part 54 are connected to form a loop. The first component part 51, the second component part 52, the third component part 53, and the fourth component part 54 cooperatively define the first cavity 55 therein. The first inflatable component 5 is inflated by injecting gas into the first cavity 55.

In this embodiment, the second inflatable component 6 includes a fifth component part 61, a sixth component part 62, and a seventh component part 63. A first end of the fifth component part 61 is connected to the sixth component part 62, and a second end of the fifth component part 61 is connected to the seventh component part 63. A fifth bending portion 611 is formed at a junction between the fifth component part 61 and the sixth component part 62. A sixth bending portion 612 is formed at a junction between the fifth component part 61 and the seventh component part 63. Through the above structure, the fifth bending portion 611 corresponds to the first bending portion 511 and is arranged at a bottom portion of the first bending portion 511. The sixth bending portion 612 corresponds to the second bending portion 512 and is arranged at a bottom portion of the second bending portion 512. The fifth component part 61 is arranged at a bottom portion of the first component part 51 and is in communication with the first component part 51. The sixth component part 62 is arranged at a bottom portion of the second component part 52 and is in communication with the second component part 52. The seventh component part 63 is arranged at a bottom portion of the third component part 53 and is in communication with the third component part 53.

In this embodiment, the second inflatable component 6 further includes an eighth component part 64. A first end of the eighth component part 64 is connected to the sixth component part 62, and a second end of the eighth component part 64 is connected to the seventh component part 63. A seventh bending portion 613 is formed at a junction between the eighth component part 64 and the sixth component part 62. An eighth bending portion 614 is formed at a junction between the eighth component part 64 and the seventh component part 63. The seventh bending portion 613 corresponds to the third bending portion 513 and is arranged at a bottom portion of the third bending portion 513. The eighth bending portion 614 corresponds to the fourth bending portion 514 and is arranged at a bottom portion of the fourth bending portion 514. The eighth component part 64 is arranged at a bottom portion of the fourth component part 54 and is in communication with the fourth component part 54. The fifth component part 61, the sixth component part 62, the seventh component part 63, and the eighth component part 64 are connected to form a second cavity 65. The second cavity 65 is in communication with the first cavity 55. Through the above structure, the fifth component part 61, the sixth component part 62, the seventh component part 63, and the eighth component part 64 are connected to form a loop. Further, the fifth component part 61, the sixth component part 62, the seventh component part 63, and the eighth component part 64 cooperatively define the second cavity 65 therein. The second cavity 65 is in communication with the first cavity 55. In this way, gas is injected into the second cavity 65 from the first cavity 55, so that the second inflatable component 6 is inflated.

In this embodiment, the plurality of inflatable components 2 further include a third inflatable component 7. The third inflatable component 7 is arranged at a bottom portion of the second inflatable component 6. The third inflatable component 7 is in communication with the second inflatable component 6. A second folding portion 200 is formed at a junction between the third inflatable component 7 and the second inflatable component 6. Through the above structure, the second inflatable component 6 is in communication with the third inflatable component 7. When the gas in the third inflatable component 7 and the second inflatable component 6 is discharged, the third inflatable component 7 and the second inflatable component 6 can be folded through the second folding portion 200, which facilitates storage and carrying.

In this embodiment, the third inflatable component 7 includes a ninth component part 71, a tenth component part 72, and an eleventh component part 73. A first end of the ninth component part 71 is connected to the tenth component part 72, and a second end of the ninth component part 71 is connected to the eleventh component part 73. A ninth bending portion 711 is formed at a junction between the ninth component part 71 and the tenth component part 72. A tenth bending portion 712 is formed at a junction between the ninth component part 71 and the eleventh component part 73. Through the above structure, the ninth bending portion 711 corresponds to the fifth bending portion 611 and is arranged at a bottom portion of the fifth bending portion 611. The tenth bending portion 712 corresponds to the sixth bending portion 612 and is arranged at a bottom portion of the sixth bending portion 612. The ninth component part 71 is arranged at a bottom portion of the fifth component part 61 and is in communication with the fifth component part 61. The tenth component part 72 is arranged at a bottom portion of the sixth component part 62 and is in communication with the sixth component part 62. The eleventh component part 73 is arranged at a bottom portion of the seventh component part 63 and is in communication with the seventh component part 63. The twelfth component part 74 is arranged at a bottom portion of the eighth component part 64 and is in communication with the eighth component part 64.

In this embodiment, the third inflatable component 7 further includes a twelfth component part 74. A first end of the twelfth component part 74 is connected to the tenth component part 72, and a second end of the twelfth component part 74 is connected to the eleventh component part 73. An eleventh bending portion 713 is formed at a junction between the twelfth component part 74 and the tenth component part 72. A twelfth bending portion 714 is formed at a junction between the twelfth component part 74 and the eleventh component part 73. The eleventh bending portion 713 corresponds to the seventh bending portion 613 and is arranged at a bottom portion of the seventh bending portion 613. The twelfth bending portion 714 corresponds to the eighth bending portion 614 and is arranged at a bottom portion of the eighth bending portion 614. The twelfth component part 74 is arranged at a bottom portion of the eighth component part 64 and is in communication with the eighth component part 64.

In this embodiment, the ninth component part 71, the tenth component part 72, the eleventh component part 73, and the twelfth component part 74 are connected to form a third cavity 75. The third cavity 75 is in communication with the second cavity 65. The ninth component part 71, the tenth component part 72, the eleventh component part 73, and the twelfth component part 74 are connected to form a loop. The ninth component part 71, the tenth component part 72, the eleventh component part 73, and the twelfth component part 74 cooperatively define the third cavity 75 therein. The third cavity 75 is in communication with the second cavity 65. In this way, gas is injected into the third cavity 75 from the second cavity 65, so that the third inflatable component 7 is inflated.

In this embodiment, the inflatable component 2 further includes a fourth inflatable component 8. The fourth inflatable component 8 is arranged in the third inflatable component 7 and is connected to the third inflatable component 7. The fourth inflatable component 8 includes a first end 81, a second end 82, a third end 83, and a fourth end 84. The first end 81 of the fourth inflatable component 8 is connected to the ninth component part 71, and the first end 81 is in communication with an interior of the ninth component part 71. The second end 82 of the fourth inflatable component 8 is connected to the tenth component part 72, and the second end 82 is in communication with the tenth component part 72. The third end 83 of the fourth inflatable component 8 is connected to the eleventh component part 73, and the third end 83 is in communication with the eleventh component part 73. The fourth end 84 of the fourth inflatable component 8 is connected to the twelfth component part 74, and the fourth end 84 is in communication with the twelfth component part 74. A fourth cavity 85 is defined in the fourth inflatable component 8, and the fourth cavity 85 is in communication with the third cavity 75. In this way, gas is injected into the fourth cavity 85 from the third cavity 75, so that the fourth inflatable component 8 is inflated. The fourth inflatable component 8 serves as a bottom portion of the main body 1 and is laid on a ground.

In this embodiment, a first through hole 56 is defined in the first inflatable component 5, and the solar module 4 is arranged in the first through hole 56. The solar module 4 includes a solar panel 41 and a fixing bracket 42. The solar panel 41 is arranged on the fixing bracket 42. The first inflatable component 5 is further provided with a cover plate 59. The cover plate 59 is configured for covering on the first through hole 56, and the cover plate 59 is positioned at one side of the solar panel 41. The cover plate 59 is made of transparent material. The control board 400 is arranged in the first cavity 55, and the control board 400 is arranged on the fixing bracket 42. The solar panel 41 is electrically connected to the control board 400. A battery 500 is arranged in the first cavity 55, and the battery 500 is electrically connected to the control board 400. Through the above structure, preferably, the solar panel in this embodiment is an FR-4 type full fiberglass high-efficiency monocrystalline panel with specifications of 5 Volts/300 milliampere (mA). The dimension of the monocrystalline panel is 125 mm×80 mm. During daytime, sunlight passes through the cover plate 59 and shines on the solar panel 41. The solar panel 41 is configured for receiving the solar energy and transmitting the solar energy to the control board 400. Further, the solar energy is converted into electrical energy by the control board 400, and the electrical energy is stored in the battery 500. This configuration is more energy-efficient and user-friendly, as it requires no external power source. Preferably, in this embodiment, the battery is configured as a 18650-2000 mAh lithium-ion battery. Therefore, the battery is configured for supplying power to LED lamps at night, so as to meet the lighting needs of the swimming pool.

In this embodiment, the light-emitting module 3 is arranged in the first cavity 55. The light-emitting module 3 includes a plurality of LED lamps 31 and a plurality of fixing members 32. The plurality of fixing members 32 are distributed and fixed on an inner wall of the first cavity 55. Each LED lamp 31 is arranged on each fixing member 32. The plurality of LED lamps 31 are all electrically connected to the control board 400. The light emitted by the plurality of LED lamps 31 shines inside the first inflatable component 5. The first inflatable component 5, the second inflatable component 6, the third inflatable component 7, and the fourth inflatable component 8 are all made of light-transmitting material. The light inside the first inflatable component 5 transmits to an exterior of the first inflatable component 5 and illuminates the swimming pool. Preferably, in this embodiment, the LED lamp includes 11 patch full-color lights placed in a plastic box. Specification of a light panel is (600+600 (with Electrostatic Discharge)+600+600 (with Electrostatic Discharge)+600+600 (with Electrostatic Discharge)+600+600 (with Electrostatic Discharge)+600+600 (with Electrostatic Discharge)+600 mm). Specifically, the light panel includes a plurality of light panel units of 600 mm. A length of a light string is 600 mm, and the light string use white, UL 1571-compliant, 26 AWG, 3-pole parallel connection cable. The LED lamps 31 is capable of providing colorful lighting effects, so as to bring a wonderful experience to users in the swimming pool. A button 58 is arranged on the first inflatable component 5, and the button 58 is electrically connected to the control board 400. In this way, the LED lamps 31 can be controlled to turn on or turn off by pressing the button 58.

Figure 10:
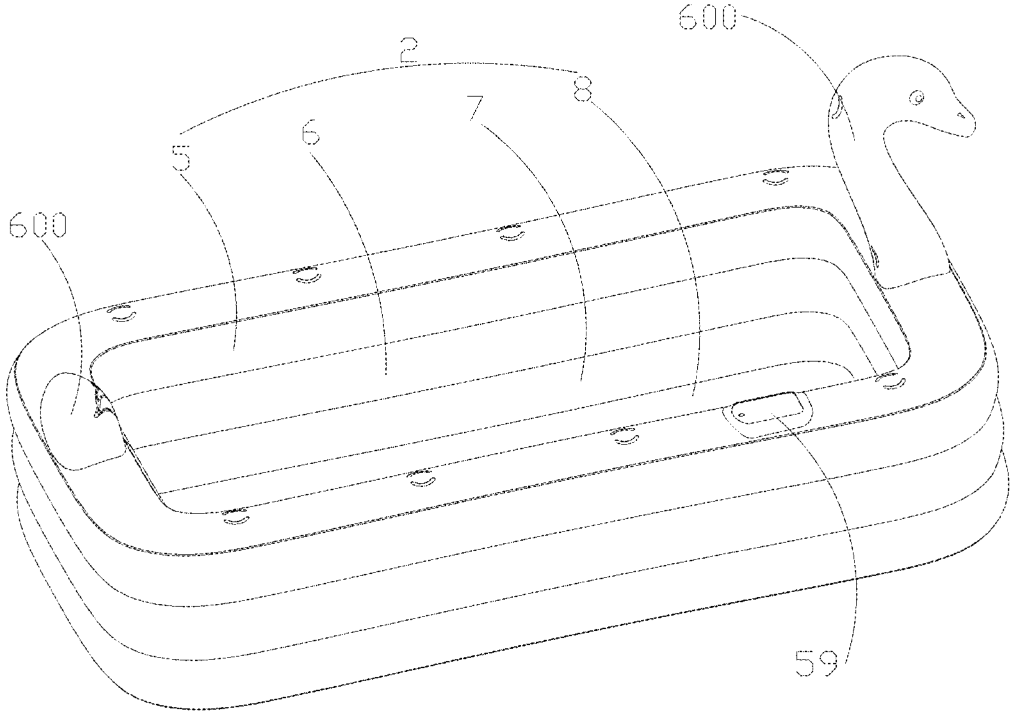
FIG. 10 is a structural diagram of the first embodiment of the present disclosure.
Figure 11:
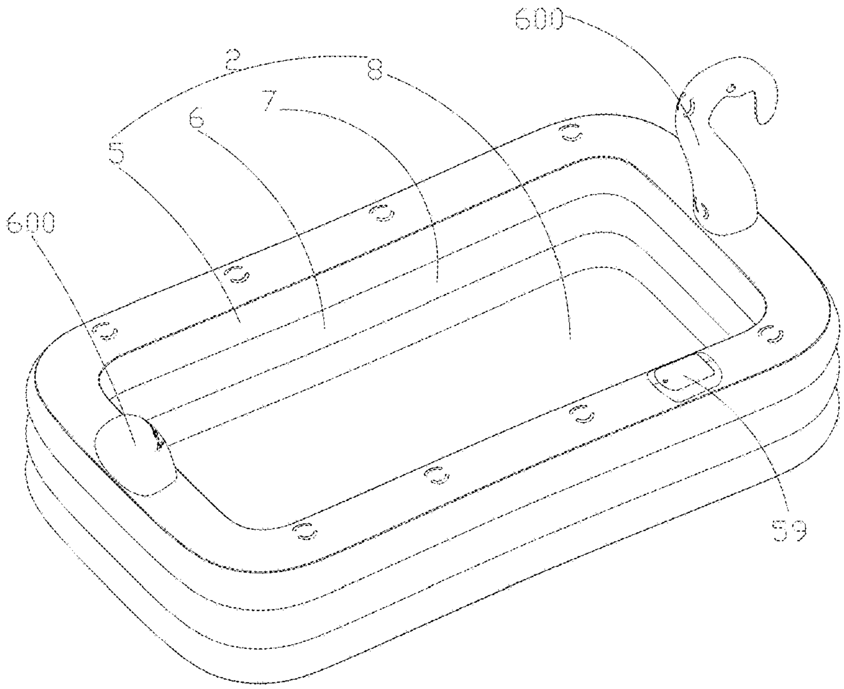
FIG. 11 is another structural diagram of the first embodiment of the present disclosure.
Figure 12:
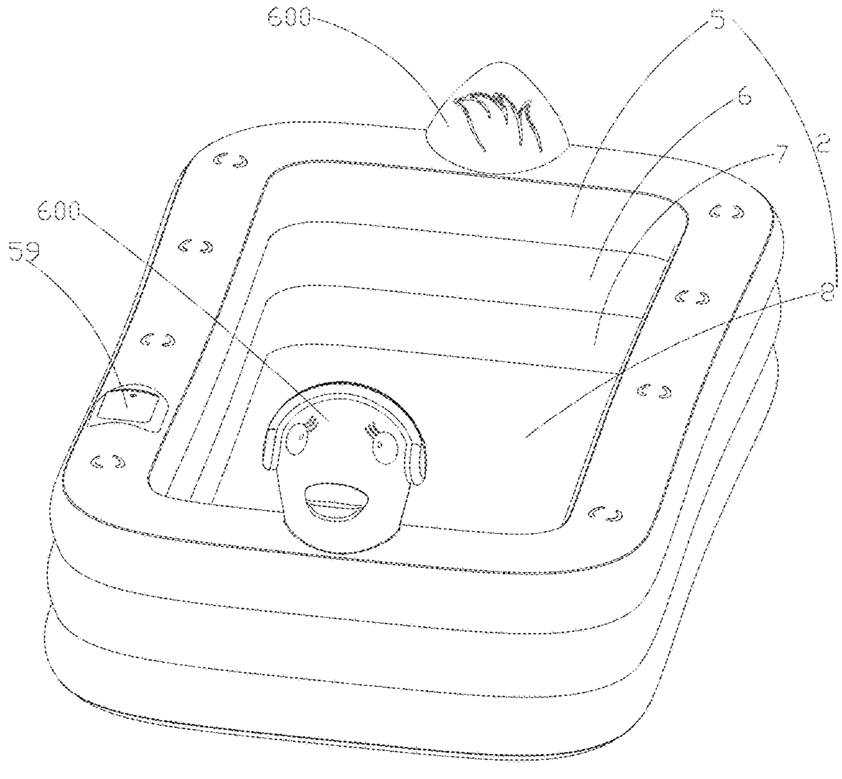
FIG. 12 is yet another structural diagram of the first embodiment of the present disclosure.

In the first embodiment, referring to FIG. 10-FIG. 12, a solar-powered inflatable swimming pool with lights includes the main body 1, the light-emitting module 3, and the solar module 4. The main body 1 is provided with a plurality of inflatable components 2. The light-emitting module 3 is arranged in the main body 1. The solar module 4 is arranged on the main body 1. The solar module 4 is configured for receiving solar energy and transmitting the solar energy to the light-emitting module 3.

The plurality of inflatable components 2 include the first inflatable component 5 and the second inflatable component 6. The first inflatable component 5 is arranged on an upper portion of the second inflatable component 6. The first inflatable component 5 is in communication with the second inflatable component 6. The plurality of inflatable components 2 further include the third inflatable component 7. The third inflatable component 7 is arranged at a bottom portion of the second inflatable component 6. The third inflatable component 7 is in communication with the second inflatable component 6. The plurality of inflatable components 2 further include the fourth inflatable component 8. The fourth inflatable component 8 is arranged in the third inflatable component 7 and is connected to the third inflatable component. Decorative members 600 are arranged on the first inflatable component 5. An inner portion of the decorative member 600 is in communication with an inner portion of the first inflatable component 5. The decorative members 600 can enhance entertainment value of the inflatable swimming pool.

Figure 13:
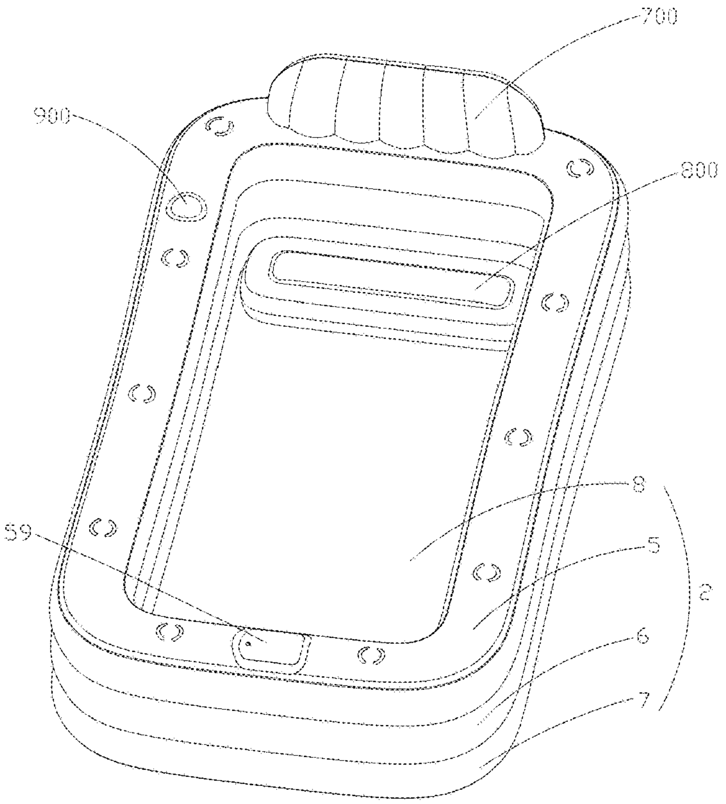
FIG. 13 is a structural diagram of the second embodiment of the present disclosure.
Figure 14:
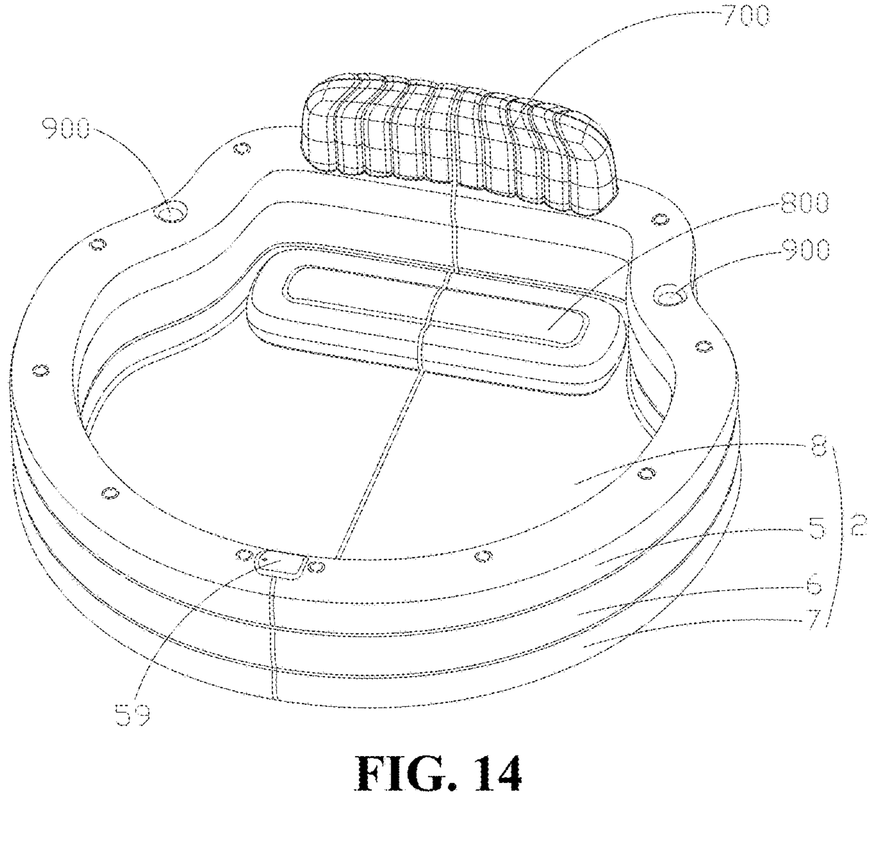
FIG. 14 is another structural diagram of the second embodiment of the present disclosure.
Figure 15:
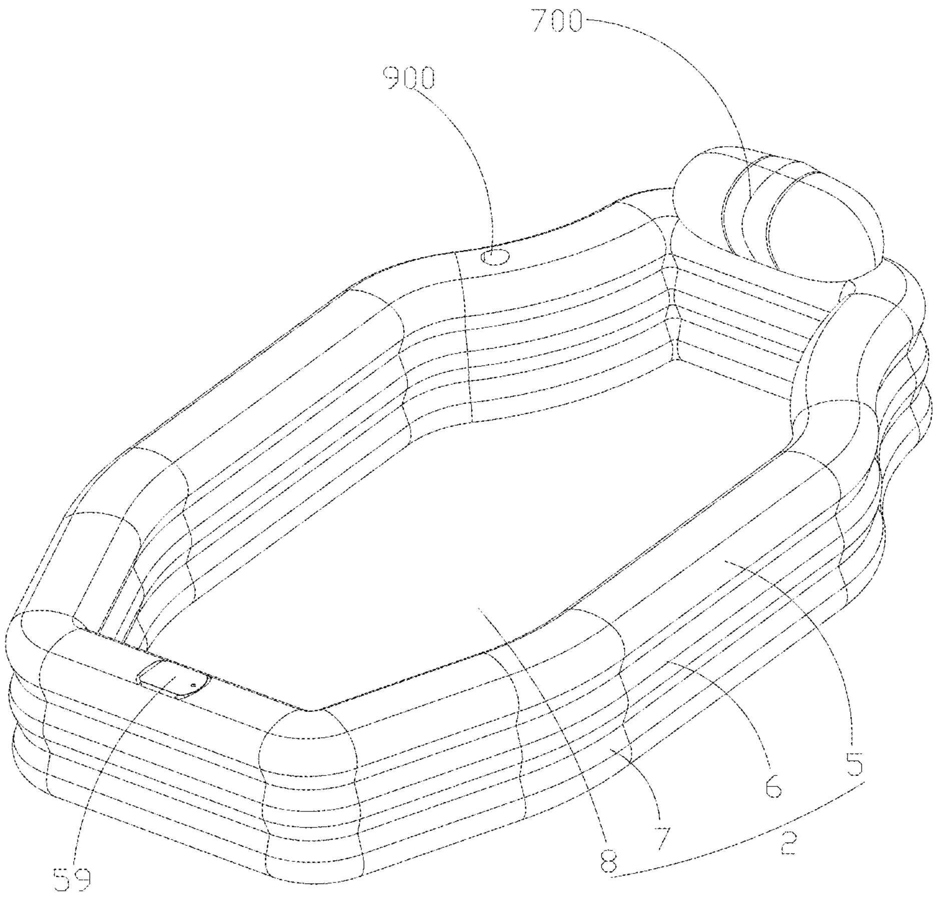
FIG. 15 is yet another structural diagram of the second embodiment of the present disclosure.

In the second embodiment, referring to FIG. 13-FIG. 15, a solar-powered inflatable swimming pool with lights includes the main body 1, the light-emitting module 3, and the solar module 4. The main body 1 is provided with a plurality of inflatable components 2. The light-emitting module 3 is arranged in the main body 1. The solar module 4 is arranged on the main body 1. The solar module 4 is configured for receiving solar energy and transmitting the solar energy to the light-emitting module 3. The plurality of inflatable components 2 include the first inflatable component 5 and the second inflatable component 6. The first inflatable component 5 is arranged on an upper portion of the second inflatable component 6. The first inflatable component 5 is in communication with the second inflatable component 6. The plurality of inflatable components 2 further include the third inflatable component 7. The third inflatable component 7 is arranged at a bottom portion of the second inflatable component 6. The third inflatable component 7 is in communication with the second inflatable component 6. The plurality of inflatable components 2 further include the fourth inflatable component 8. The fourth inflatable component 8 is arranged in the third inflatable component 7 and is connected to the third inflatable component. A headrest portion 700 and a groove 900 are arranged on the first inflatable component 5. The headrest portion 700 is in communication with the inner portion of the first inflatable component 5. The headrest portion 700 allows a user's head to rest on the headrest portion 700. The groove 900 allows users to place a cup containing beverage. A total number of the groove 900 can be one or multiple. The fourth inflatable component 8 is provided with a seat cushion portion 800. The seat cushion portion 800 is in communication with an inner portion of the fourth inflatable component 8. The seat cushion portion 800 allows users to sit in the swimming pool and rest their heads on the headrest portion 700.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

The invention claimed is:

1. A solar-powered inflatable swimming pool with lights, comprising:

a main body, the main body being provided with a plurality of inflatable components;

a light-emitting module, the light-emitting module being arranged in the main body, and the light-emitting module being configured for emitting light and illuminating a swimming pool and a periphery of the swimming pool;

a solar module, wherein the solar module is arranged on the main body; the solar module is configured for receiving solar energy and converting the solar energy into electrical energy for storage via a control board, and the control board is configured for transmitting the electrical energy to the light-emitting module and supplying power to the light-emitting module;

wherein the solar module comprises a solar panel and a fixing bracket, and the solar panel is arranged on the fixing bracket;

the main body is provided with a first cavity, the control board is arranged in the first cavity, and the control board is arranged on the fixing bracket;

the light-emitting module is arranged in the first cavity, and the light-emitting module comprises a plurality of LED lamps and a plurality of fixing members; the plurality of fixing members are distributed and fixed on an inner wall of the first cavity, and each LED lamp is arranged on each fixing member.

2. The solar-powered inflatable swimming pool with lights according to claim 1, wherein the plurality of inflatable components comprise a first inflatable component and a second inflatable component, the first inflatable component is arranged on an upper portion of the second inflatable component, and the first inflatable component is in communication with the second inflatable component; a first folding portion is formed at a junction between the first inflatable component and the second inflatable component.

3. The solar-powered inflatable swimming pool with lights according to claim 2, wherein the first inflatable component comprises a first component part, a second component part, and a third component part, a first end of the first component part is connected to the second component part, and a second end of the first component part is connected to the third component part; a first bending portion is formed at a junction between the first component part and the second component part, and a second bending portion is formed at a junction between the first component part and the third component part.

4. The solar-powered inflatable swimming pool with lights according to claim 3, wherein the first inflatable component further comprises a fourth component part, a first end of the fourth component part is connected to the second component part, and a second end of the fourth component part is connected to the third component part; a third bending portion is formed at a junction between the fourth component part and the second component part, and a fourth bending portion is formed at a junction between the fourth component part and the third component part.

5. The solar-powered inflatable swimming pool with lights according to claim 4, wherein the first component part, the second component part, the third component part, and the fourth component part are connected to form the first cavity.

6. The solar-powered inflatable swimming pool with lights according to claim 5, wherein the second inflatable component comprises a fifth component part, a sixth component part, and a seventh component part, a first end of the fifth component part is connected to the sixth component part, and a second end of the fifth component part is connected to the seventh component part; a fifth bending portion is formed at a junction between the fifth component part and the sixth component part, and a sixth bending portion is formed at a junction between the fifth component part and the seventh component part.

7. The solar-powered inflatable swimming pool with lights according to claim 6, wherein the second inflatable component further comprises an eighth component part, a first end of the eighth component part is connected to the sixth component part, and a second end of the eighth component part is connected to the seventh component part; a seventh bending portion is formed at a junction between the eighth component part and the sixth component part, and an eighth bending portion is formed at a junction between the eighth component part and the seventh component part.

8. The solar-powered inflatable swimming pool with lights according to claim 7, wherein the fifth component part, the sixth component part, the seventh component part, and the eighth component part are connected to form a second cavity, and the second cavity is in communication with the first cavity.

9. The solar-powered inflatable swimming pool with lights according to claim 2, wherein the plurality of inflatable components further comprise a third inflatable component, the third inflatable component is arranged at a bottom portion of the second inflatable component, and the third inflatable component is in communication with the second inflatable component; a second folding portion is formed at a junction between the third inflatable component and the second inflatable component.

10. The solar-powered inflatable swimming pool with lights according to claim 9, wherein the third inflatable component comprises a ninth component part, a tenth component part, and an eleventh component part, a first end of the ninth component part is connected to the tenth component part, and a second end of the ninth component part is connected to the eleventh component part; a ninth bending portion is formed at a junction between the ninth component part and the tenth component part, and a tenth bending portion is formed at a junction between the ninth component part and the eleventh component part.

11. The solar-powered inflatable swimming pool with lights according to claim 10, wherein the third inflatable component further comprises a twelfth component part, a first end of the twelfth component part is connected to the tenth component part, and a second end of the twelfth component part is connected to the eleventh component part; an eleventh bending portion is formed at a junction between the twelfth component part and the tenth component part, and a twelfth bending portion is formed at a junction between the twelfth component part and the eleventh component part.

12. The solar-powered inflatable swimming pool with lights according to claim 11, wherein the ninth component part, the tenth component part, the eleventh component part, and the twelfth component part are connected to form a third cavity, and the third cavity is in communication with the second cavity.

13. The solar-powered inflatable swimming pool with lights according to claim 12, wherein the inflatable component further comprises a fourth inflatable component, the fourth inflatable component is arranged in the third inflatable component, and the fourth inflatable component is connected to the third inflatable component.

14. The solar-powered inflatable swimming pool with lights according to claim 13, wherein the fourth inflatable component comprises a first end, a second end, a third end, and a fourth end, the first end of the fourth inflatable component is connected to the ninth component part, the second end of the fourth inflatable component is connected to the tenth component part, the third end of the fourth inflatable component is connected to the eleventh component part, and the fourth end of the fourth inflatable component is connected to the twelfth component part.

15. The solar-powered inflatable swimming pool with lights according to claim 13, wherein a fourth cavity is defined in the fourth inflatable component, and the fourth cavity is in communication with the third cavity.

16. The solar-powered inflatable swimming pool with lights according to claim 5, wherein a first through hole is defined in the first inflatable component, and the solar module is arranged in the first through hole; the first inflatable component is further provided with a cover plate, the cover plate is configured for covering on the first through hole, and the cover plate is positioned at one side of the solar panel; the cover plate is made of transparent material.

17. The solar-powered inflatable swimming pool with lights according to claim 16, wherein the solar panel is electrically connected to the control board.

18. The solar-powered inflatable swimming pool with lights according to claim 17, wherein the plurality of LED lamps are electrically connected to the control board.

19. The solar-powered inflatable swimming pool with lights according to claim 5, wherein a battery is arranged in the first cavity, and the battery is electrically connected to the control board.

20. The solar-powered inflatable swimming pool with lights according to claim 17, wherein a button is arranged on the first inflatable component, and the button is electrically connected to the control board.

* * * * *